US012467185B2

(12) United States Patent
Reeves et al.

(10) Patent No.: US 12,467,185 B2
(45) Date of Patent: Nov. 11, 2025

(54) SYSTEMS AND METHODS FOR OPERATING A LAUNDRY TREATMENT APPLIANCE TO DETECT ERRONEOUS MOISTURE LEVELS

(71) Applicant: Haier US Appliance Solutions, Inc., Wilmington, DE (US)

(72) Inventors: Joshua Reeves, Louisville, KY (US); Ionelia Silvia Prajescu, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 632 days.

(21) Appl. No.: 17/962,786

(22) Filed: Oct. 10, 2022

(65) Prior Publication Data

US 2024/0117550 A1 Apr. 11, 2024

(51) Int. Cl.

| | |
|---|---|
| ***D06F 34/18*** | (2020.01) |
| ***D06F 34/06*** | (2020.01) |
| ***D06F 58/02*** | (2006.01) |
| ***D06F 58/38*** | (2020.01) |
| ***D06F 58/46*** | (2020.01) |
| ***G05D 22/02*** | (2006.01) |
| *D06F 101/02* | (2020.01) |
| *D06F 103/08* | (2020.01) |
| *D06F 105/12* | (2020.01) |
| *D06F 105/52* | (2020.01) |
| *D06F 105/56* | (2020.01) |

(52) U.S. Cl.

CPC .............. *D06F 34/18* (2020.02); *D06F 34/06* (2020.02); *D06F 58/02* (2013.01); *D06F 58/38* (2020.02); *D06F 58/46* (2020.02); *G05D 22/02* (2013.01); *D06F 2101/02* (2020.02); *D06F 2103/08* (2020.02); *D06F 2105/12* (2020.02); *D06F 2105/52* (2020.02); *D06F 2105/56* (2020.02)

(58) Field of Classification Search

None

See application file for complete search history.

(56) References Cited

U.S. PATENT DOCUMENTS

| | | | |
|---|---|---|---|
| 7,013,578 | B2 | 3/2006 | Wunderlin et al. |
| 8,578,627 | B2 | 11/2013 | Kmet et al. |
| 9,080,282 | B2 | 7/2015 | Zambrowicz et al. |
| 9,745,690 | B2 | 8/2017 | Lee et al. |

FOREIGN PATENT DOCUMENTS

| | | | |
|---|---|---|---|
| KR | 940006250 | B1 | 9/1994 |
| KR | 20060120883 | A | 11/2006 |
| KR | 100701110 | B1 | 3/2007 |

*Primary Examiner* — Jason Lau

(74) *Attorney, Agent, or Firm* — Dority & Manning, P.A.

(57) ABSTRACT

A method of operating a laundry treatment appliance includes initiating a drying cycle, the drying cycle including a first goal value of a moisture goal of a laundry load; initiating a sensing process, the sensing process including measuring, via the moisture sensor, a first moisture level within a first predetermined time interval; determining that the first moisture level is above the first goal value within the first predetermined time interval; measuring, as part of the sensing process via the moisture sensor, a second moisture level within a second predetermined time interval subsequent to the first predetermined time interval; determining the second moisture level is greater than the first moisture level; and setting the moisture goal based on determining that the second moisture level is greater than the first moisture level.

18 Claims, 5 Drawing Sheets

SYSTEMS AND METHODS FOR OPERATING A LAUNDRY TREATMENT APPLIANCE TO DETECT ERRONEOUS MOISTURE LEVELS

FIELD OF THE INVENTION

The present subject matter relates generally to laundry treatment appliances, and more particularly to detecting moisture levels within laundry treatment appliances.

BACKGROUND OF THE INVENTION

Laundry treatment appliances (such as dryer appliances) generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein. Typically, an air handler or blower is used to urge the flow of heated air from chamber, through a trap duct, and to the exhaust duct where it is exhausted from the dryer appliance.

Some laundry treatment appliances include moisture sensors provided within the drum to measure a level of moisture of the articles therein. When operating the appliance according to a sensor dry operation, the moisture sensor continually detects the moisture level of the articles through the operation. However, the moisture sensor may occasionally produce false readings of the moisture within the articles. For instance, in an early portion of a drying cycle, the moisture sensor may provide inaccurate moisture readings due to inconsistent contact with the articles or due to the heat provided to the drum during the early portion of the drying cycle. When the moisture sensor produces a moisture level that is adequate for the appliance to conclude that the washing articles are dry enough to consider the drying cycle to be completed, the drying cycle may be prematurely ended, resulting in damp articles and dissatisfaction with appliance performance.

Accordingly, a laundry treatment appliance that obviates one or more of the above-mentioned drawbacks would be beneficial. In particular, a laundry treatment appliance that reduces or eliminates false readings of a desired dryness level (or otherwise improves accuracy of dryness detection relative to existing appliances) would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry treatment appliance is provided. The laundry treatment appliance may include a rotatable drum and a moisture sensor provided in the rotatable drum. The method may include initiating a drying cycle, the drying cycle including a first goal value of a moisture goal of a laundry load; initiating a sensing process, the sensing process including measuring, via the moisture sensor, a first moisture level within a first predetermined time interval; determining that the first moisture level is above the first goal value within the first predetermined time interval; measuring, as part of the sensing process via the moisture sensor, a second moisture level within a second predetermined time interval subsequent to the first predetermined time interval; determining the second moisture level is greater than the first moisture level; and setting the moisture goal based on determining that the second moisture level is greater than the first moisture level.

In another exemplary aspect of the present disclosure, a laundry treatment appliance is provided. The laundry treatment appliance may include a cabinet; a drum rotatably mounted within the cabinet, the drum defining a chamber to selectively receive a laundry load; a moisture sensor provided within the chamber to sense a moisture level of the laundry load; and a controller operably connected with the moisture sensor. The controller may be configured for initiating a drying cycle, the drying cycle including a first goal value of a moisture goal of a laundry load; initiating a sensing process, the sensing process including measuring, via the moisture sensor, a first moisture level within a first predetermined time interval; determining that the first moisture level is above the first goal value within the first predetermined time interval; measuring, as part of the sensing process via the moisture sensor, a second moisture level within a second predetermined time interval subsequent to the first predetermined time interval; determining the second moisture level is greater than the first moisture level; and setting the moisture goal based on determining that the second moisture level is greater than the first moisture level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
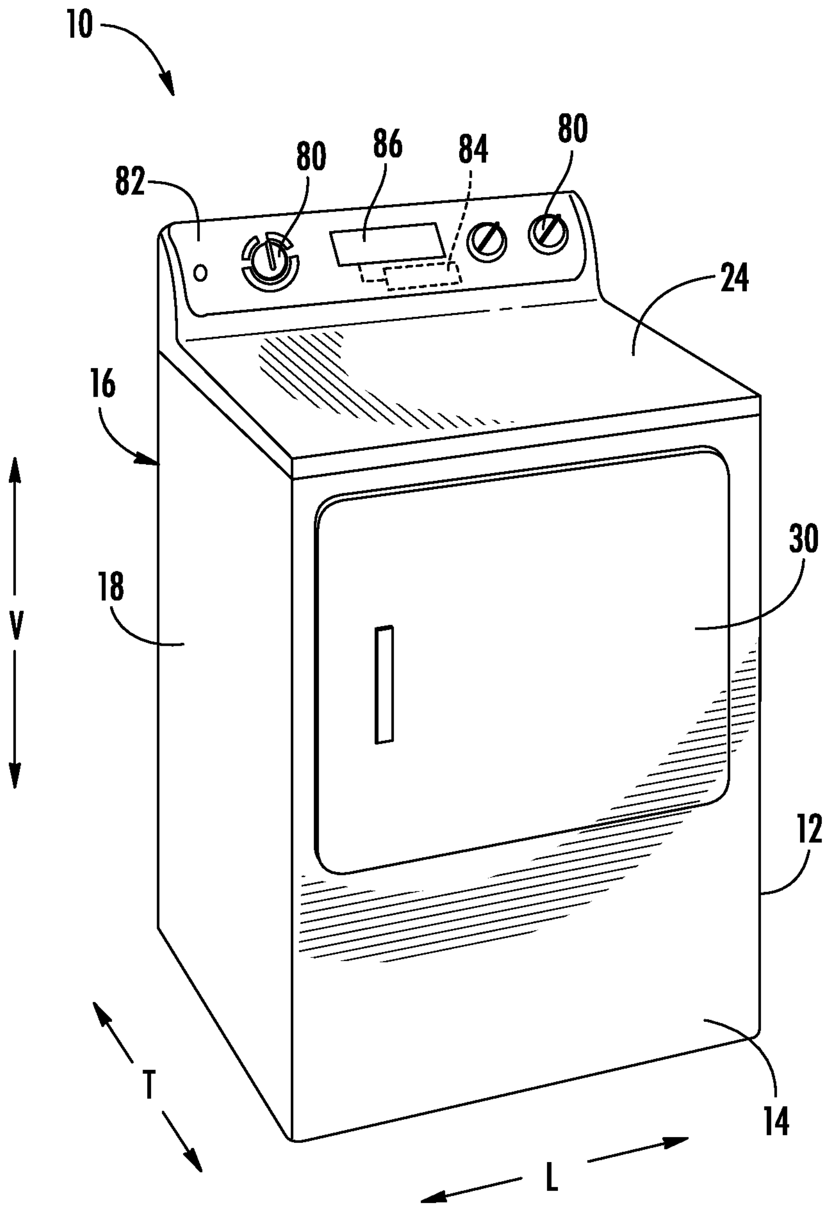
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
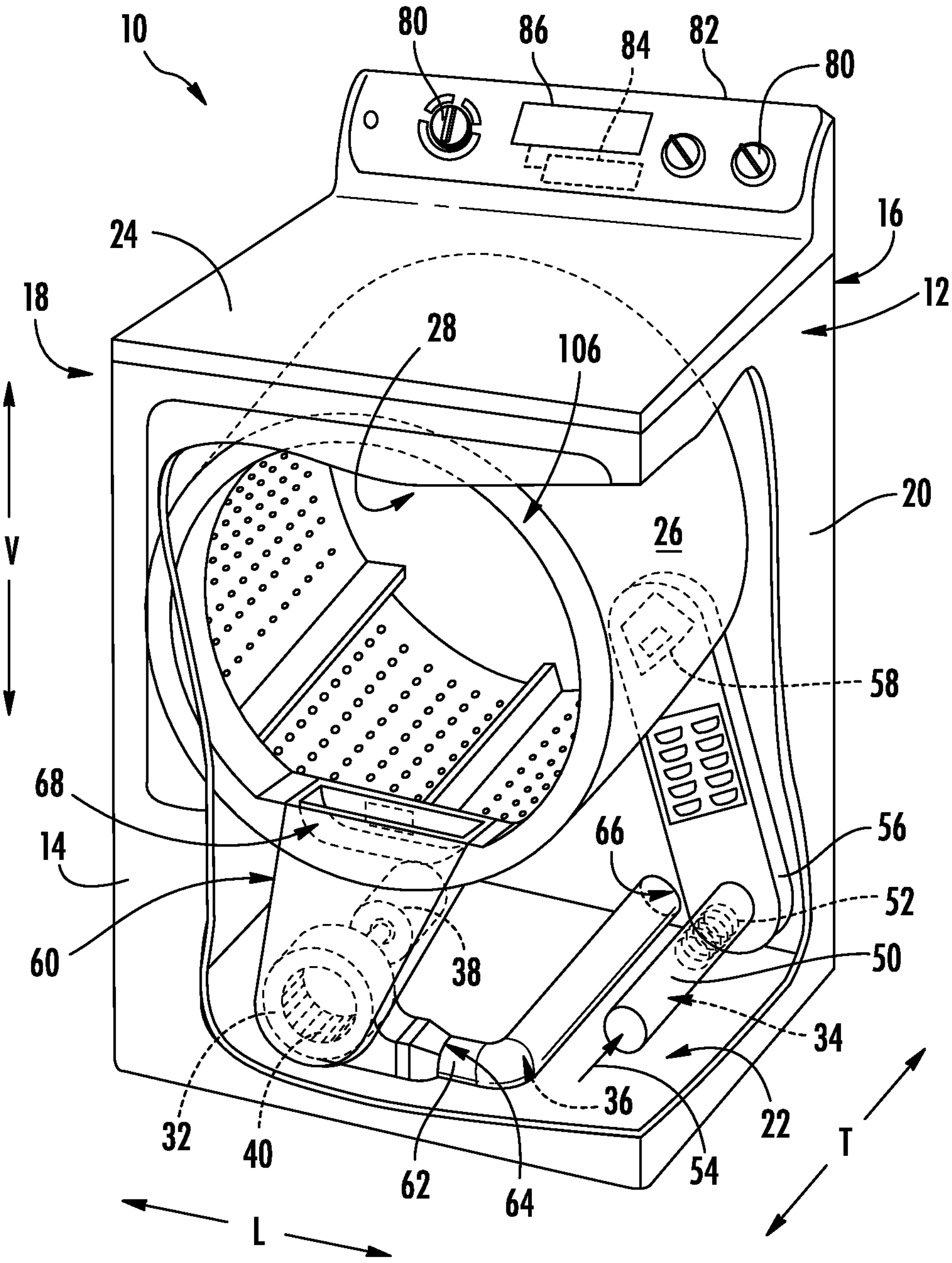
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a cabinet backsplash 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on cabinet backsplash 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation of heating assembly 50 based on one or more temperatures detected by the temperature sensors or air flow measurements from the airflow sensors.

Figure 3:
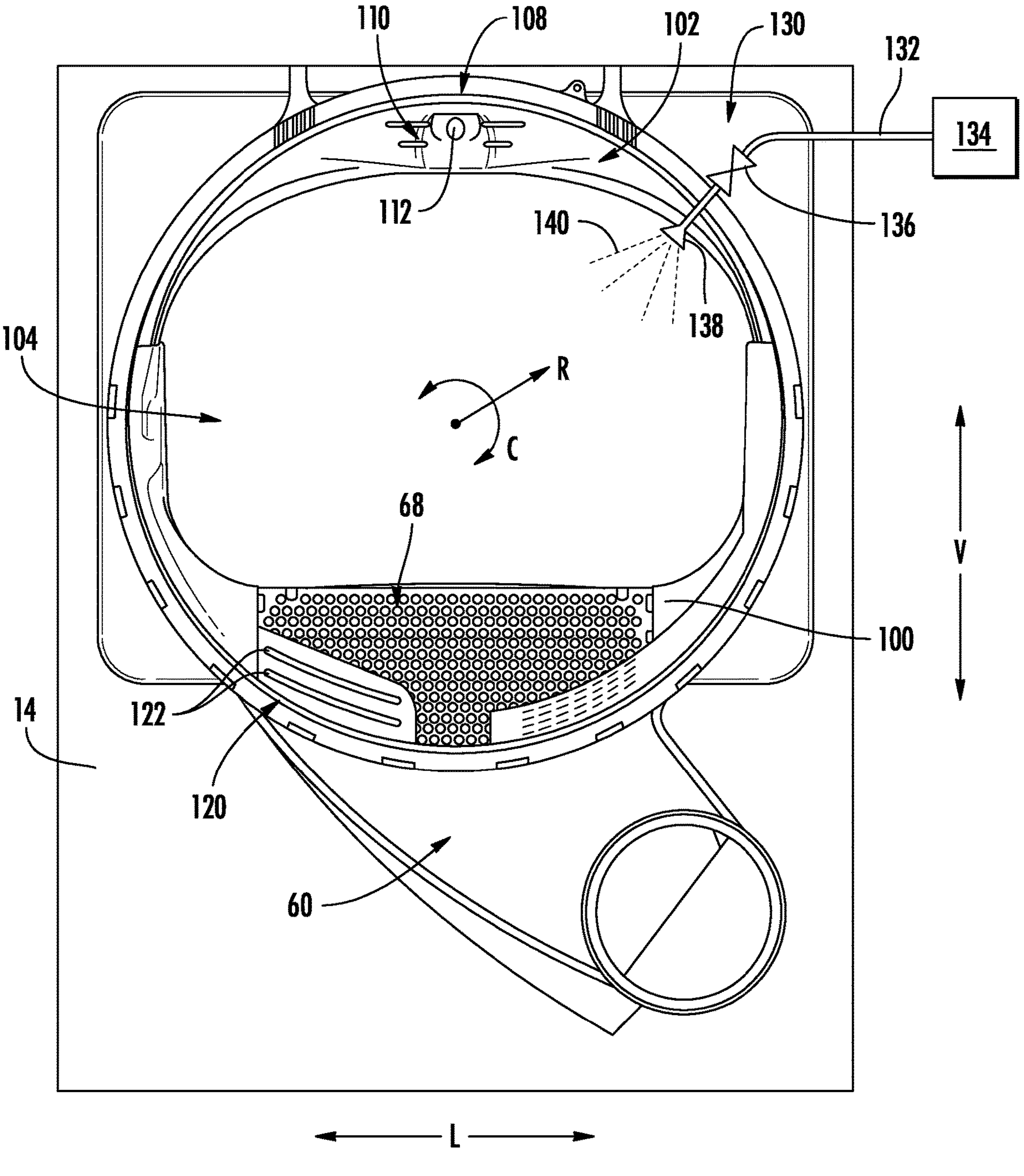
FIG. 3 provides a rear view of a top bearing of the exemplary dryer appliance of FIG. 1 according to an exemplary embodiment of the present subject matter.

Referring now generally to FIG. 3, dryer appliance 10 may include a front bulkhead 100 and a top bearing 102 mounted to front panel 14. Specifically, for example, front bulkhead 100 may be mounted directly to a backside of front panel 14 and may define an opening 104 through which chamber 28 may be accessed. Front bulkhead 100 may generally define a front end of chamber 28. In addition, front bulkhead 100 may house or support various components of dryer appliance, such as trap duct 60, filter portion 68, sensors, or other dryer components.

Top bearing 102 may be mounted directly to front bulkhead 102 and may be generally configured for supporting drum 26 as it rotates and housing various other dryer components. In this regard, top bearing 102 is generally positioned at a front of drum 26 and cabinet 12, e.g., proximate a front lip 106 (see FIG. 2) of drum 26. Top bearing 102 defines an outer surface 108 on which drum 26 may rotate. As best shown in FIG. 3, top bearing 102 may define a bulb housing 110 for receiving a light bulb 112 for illuminating chamber 28 when desired. The electronics (not shown) for powering light bulb 112 may be housed behind the top bearing 102, e.g., within a cavity and may be operably coupled with controller 84 which may regulate operation of light bulb 112. According to exemplary embodiments, top bearing 102 may also house other sensors, such as temperature and/or humidity sensors, or other dryer components.

For example, referring still to FIG. 3, dryer appliance may include a moisture sensor 120 that is generally configured for detecting or monitoring a moisture content or dampness of a load of clothes within chamber 28 during operation of dryer appliance 10. According to the illustrated embodiment, moisture sensor 120 comprises two sensor rods 122 that are spaced apart from each other on front bulkhead 100 such that clothes within chamber 28 tumble across the sensor rods 122 during the drying process. In this manner, clothing within chamber 28 may bridge the first and second sensor rods 122 in order to close a circuit coupled to first and second sensor rods 122. Sensor rods 122 may measure a moisture content of the clothing with moisture sensor 120, e.g., by monitoring voltages associated with dampness or moisture content within the clothing. In addition, or alternatively, moisture sensor 120 may measure the resistance between sensor rods 122 or the conduction of electric current through the clothes contacting sensor rods 122.

According to the illustrated embodiment, moisture sensor 120 includes two sensor rods 122 mounted on front bulkhead 100. However, it should be appreciated that according to alternative embodiments, moisture sensor 120 may be any other suitable type of sensor positioned at any other suitable location and having any other suitable configuration for detecting moisture content within a load of clothes. Moisture sensor 120 may generally be in communication with controller 84 and may transmit readings to controller 84 as required or desired. As explained in more detail below, dryer appliance 10 can monitor chamber humidity and/or the remaining moisture content of the clothes (e.g., to determine when a drying cycle should end).

According to exemplary embodiments, and as best illustrated schematically in FIG. 3, dryer appliance may further include a water supply 130 for selectively providing water into chamber 28, e.g., to facilitate the reduction of static electricity. In this regard, as illustrated, water supply 130 includes a water supply conduit 132 fluidly coupled to a water source 134 (e.g., such as a municipal water supply). A water valve 136 is operably coupled to water supply conduit 132 for regulating the flow of water therethrough. Water supply 130 may further include a nozzle 138, such as a misting nozzle, that is fluid coupled to the water supply conduit 132 and is positioned for discharging the flow of water into chamber 28. Specifically, according to an exemplary embodiment, nozzle 138 is configured for receiving the flow of water and generating a fine mist (indicated by reference numeral 140 in FIG. 3) that is dispersed throughout chamber 28. It should be appreciated that according to alternative embodiments, dryer appliance 10 may include any other suitable number, type, position, and configuration of water supply nozzles, conduits, or subsystems.

Now that the construction of dryer appliance 10 and the configuration of controller 84 according to exemplary embodiments have been presented, an exemplary method 300 of operating a dryer appliance will be described. Although the discussion below refers to the exemplary method 300 of operating dryer appliance 10, one skilled in the art will appreciate that the exemplary method 300 is applicable to the operation of a variety of other dryer appliances or other suitable appliances. In exemplary embodiments, the various method steps as disclosed herein may be performed by controller 84 or a separate, dedicated controller. Advantageously, according to the method 300 described herein, false readings of a desired dryness level may be reduced or eliminated by considering a time stamp of a moisture level reading within the appliance. Moreover, the method 300 may improve accuracy of dryness detection relative to existing appliances.

Figure 4:
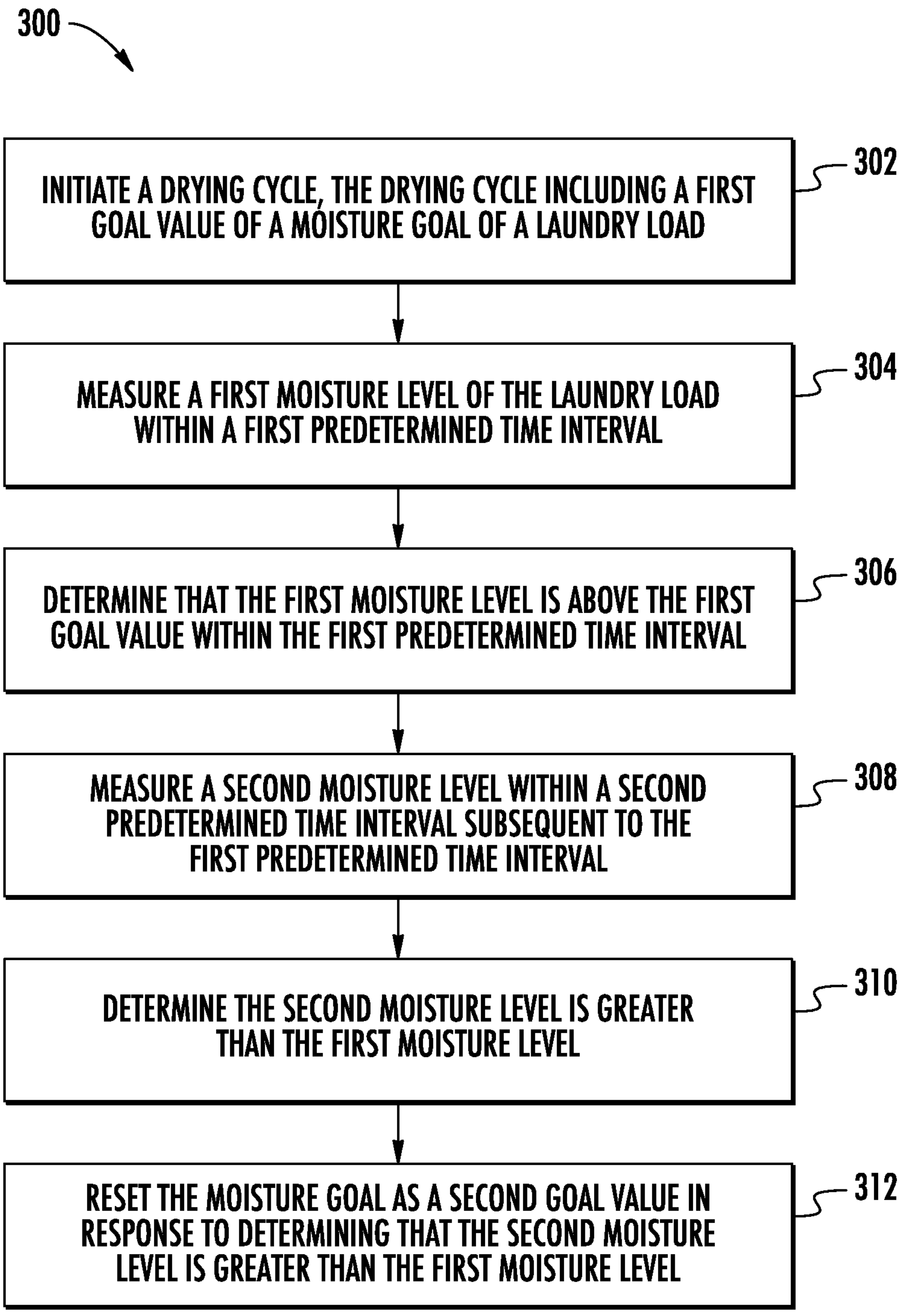
FIG. 4 provides a method of operating a dryer appliance to set a moisture goal of a laundry load within the dryer appliance according to an exemplary embodiment.

Referring to FIG. 4, at step 302, method 300 may include initiating a drying cycle. For instance, the drying cycle may include activating a heater and an air handler to motivate air throughout a drum of the dryer appliance, and driving a motor at a predetermined speed to rotate the drum. The drying cycle may include one or more selected features. Additionally or alternatively, the drying cycle may include a first goal value of a moisture goal of a laundry load. In detail, a user may initiate a drying cycle within the laundry treatment appliance (e.g., dryer appliance 10). The drying cycle may be a sensor drying cycle. For instance, the user may select a desired dryness level for the laundry load (e.g., very dry, dry, less dry, etc.). Thus, the appliance may utilize a moisture sensor (e.g., moisture sensor 120) throughout the drying cycle to monitor the dryness level (or moisture level) of the laundry load.

The moisture goal of the moisture goal may correspond to the selected dryness level. For example, the moisture goal is directly correlated with a sensor voltage as measured by the moisture sensor. Thus, if a user selects a "very dry" dryness level, the moisture goal may be determined and stored (e.g., within a memory on the appliance). According to some embodiments, the first goal value is a predetermined percentage of the moisture goal. For instance, the first goal value may be between about 85% and about 95% of the moisture goal. Advantageously, upon reaching the first goal value, an accurate time remaining of the drying cycle may be determined to reach the moisture goal. Thus, the first goal value may indicate that the moisture goal will be reached imminently, signaling the appliance to cease the drying cycle.

At step 304, method 300 may include initiating a sensing process. The sensing process may include measuring, via the moisture sensor, a first moisture level (or dryness level) within a first predetermined time interval. In detail, the moisture sensor may be activated upon initiating the drying cycle. The moisture sensor may continually monitor the moisture level of the laundry load. As described above, the moisture sensor may measure the sensor voltage and compare the sensor voltage against a target sensor voltage. For instance, the sensor voltages captured at the moisture sensor may be transmitted to the controller to be analyzed or compared against the moisture goal. Thus, the first moisture level may be a first moisture level reading (e.g., corresponding to the sensor voltages).

The first moisture level may be determined according to the sensor voltage. For instance, a higher registered sensor voltage may be indicative of a lower moisture level within the laundry load. However, the sensor voltage may fluctuate during the sensing process (e.g., due to varying contact of portions of the laundry load with the moisture sensor). Thus, the first moisture level may be monitored during the first predetermined time interval. According to some embodiments, the first predetermined time interval is between about 4 minutes and about 10 minutes. However, the first predetermined time interval may vary according to specific embodiments. For instance, the first predetermined time interval may be adjustable (e.g., selectable by the user).

At step 306, method 300 may include determining that the first moisture level (e.g., a first voltage reading) is above the first goal value within the first predetermined time interval. In detail, as the moisture sensor continually monitors the moisture level of the laundry load, the voltage readings may be sent for analysis and comparison (e.g., at the controller) against, for instance, a corresponding voltage reading for the selected dryness level of the laundry load. In particular, the voltage readings are monitored within the first predetermined time interval (e.g., between about 4 minutes and about 10 minutes). Thus, the method may determine that the first moisture level reading is above the first goal value before an expected time (e.g., within the first predetermined time interval).

The method 300 may include initiating a countdown timer in response to determining that the first moisture level is above the first goal vale. The countdown timer may include a second predetermined time interval. For instance, the second predetermined time interval may be approximately equal to the first predetermined time interval (e.g., between about 4 minutes and about 10 minutes). As the countdown timer is elapsing, the sensing process may continue to monitor the voltage readings and thus determine the moisture levels within the laundry load. In particular, the moisture sensor may monitor the moisture levels for a second moisture level, as will be explained.

At step 308, method 300 may include measuring, as part of the sensing process via the moisture sensor, a second moisture level within a second predetermined time interval subsequent to the first predetermined time interval. As mentioned above, according to the sensor dry settings, when the first moisture level is reached (e.g., as determined by the voltage reading), the appliance may be triggered to end the cycle (e.g., under a normal operation). However, when the moisture level (e.g., sensor reading) is determined to be above the first goal value within the first predetermined time interval, the method 300 may determine that the first moisture level was erroneously measured e.g., sensed).

Accordingly, the method 300 may then obtain the second measurement of the moisture level (e.g., the second moisture level) after the first goal value has been reached. For instance, the second moisture level may be obtained as a part of the sensing process. In other words, the moisture sensor may continue to constantly sense the moisture level of the laundry load (e.g., as the voltage readings). Therefore, the appliance may not prematurely stop the drying cycle (or generate a stopping signal immediately upon determining that the first moisture level is above the first goal value of the moisture goal.

At step 310, method 300 may include determining that the second moisture level is greater than the first moisture level. In detail, the method may compare the first moisture level reading (e.g., the voltage level of the first moisture level) with the second moisture level reading (e.g., the voltage level of the second moisture level). This comparison may take place continually throughout the second time interval. For instance, multiple instantaneous voltage readings may be taken by the moisture sensor during the second time interval. Each voltage reading taken during the second time interval may be compared against the first moisture level (above the first goal value) during the second time interval.

At step 312, method 300 may include setting the moisture goal based on determining that the second moisture level is greater than the first moisture level. In detail, while taking the moisture level readings (e.g., voltage readings) during the second time interval, the second moisture level may be greater than the first moisture level. As mentioned above, this may correspond to the second voltage level being less than the first voltage level. Thus, the method may conclude that the moisture level of the laundry load at the second measurement is greater than the moisture level of the laundry load at the first measurement.

Accordingly, the method may then proceed to ignore or discard any of the moisture level readings during the first predetermined time interval. In detail, the second moisture level may be determined to be greater than the first moisture level within the second time interval. The method may then conclude that the first moisture level (the first voltage reading above the first goal value) was erroneous. The method may then initiate a second sensing process after the second predetermined time interval has elapsed. According to some embodiments, the second sensing process is a continuation of the first sensing process after having discarded any moisture measurements (e.g., voltage measurements) during the first predetermined time interval. Additionally or alternatively, the second sensing process may be initiated after the second predetermine time interval has elapsed.

For instance, the method 300 may determine that the second moisture level is above the first moisture level before the second predetermined time interval has elapsed. According to the above described example, the second sending process does not initiate until the second predetermined time interval has elapsed, as opposed to an immediate determination of the second moisture level. Thus, any erroneous moisture levels based on voltage readings may be discarded and a premature ending of the drying cycle may be avoided. Moreover, upon initiating the second sensing process, a third moisture level may be measured (e.g., sensed via the moisture sensor through a measured voltage level) subsequent to the predetermined time interval. In some embodiments, the method 300 includes determining that the third moisture level is below the first goal value of the moisture goal. Additionally or alternatively, the method 300 may include establishing a second goal value of the moisture goal after initiating the second sensing process. The second goal value may be the same as the first goal value. However, the second goal value may be greater than or less than the first goal value depending on specific embodiments. Advantageously, an accurate dryness level may be ensured through performing a full drying cycle.

In some embodiments, the method 300 includes estimating a total drying time of the drying cycle based at least in part on the moisture goal. For instance, upon receiving the user input regarding the selected dryness level, the total anticipated drying time may be calculated or otherwise determined (e.g., through a look-up table, through various algorithms, etc.). Upon determining that the first moisture level (e.g., the first voltage reading) is above the first goal value of the moisture goal, the method 300 may compare the elapsed time (e.g., within the first predetermined time interval) against the total drying time. If the elapsed time below a certain threshold, the method 300 may determine that additional time is required to fully complete the drying process.

The method 300 may then include determining an additional amount of drying time in response to determining that the first moisture level (first voltage reading) is above the first goal value. For instance, this determination may be made within the first predetermined time interval. Accordingly, the method 300 may include executing the additional amount of drying time after performing the estimated total drying time. In other words, regardless of the moisture level readings performed after the first and second predetermined time intervals, the additional amount of drying time may be performed to ensure the laundry load reaches an acceptable level of dryness.

Figure 5:
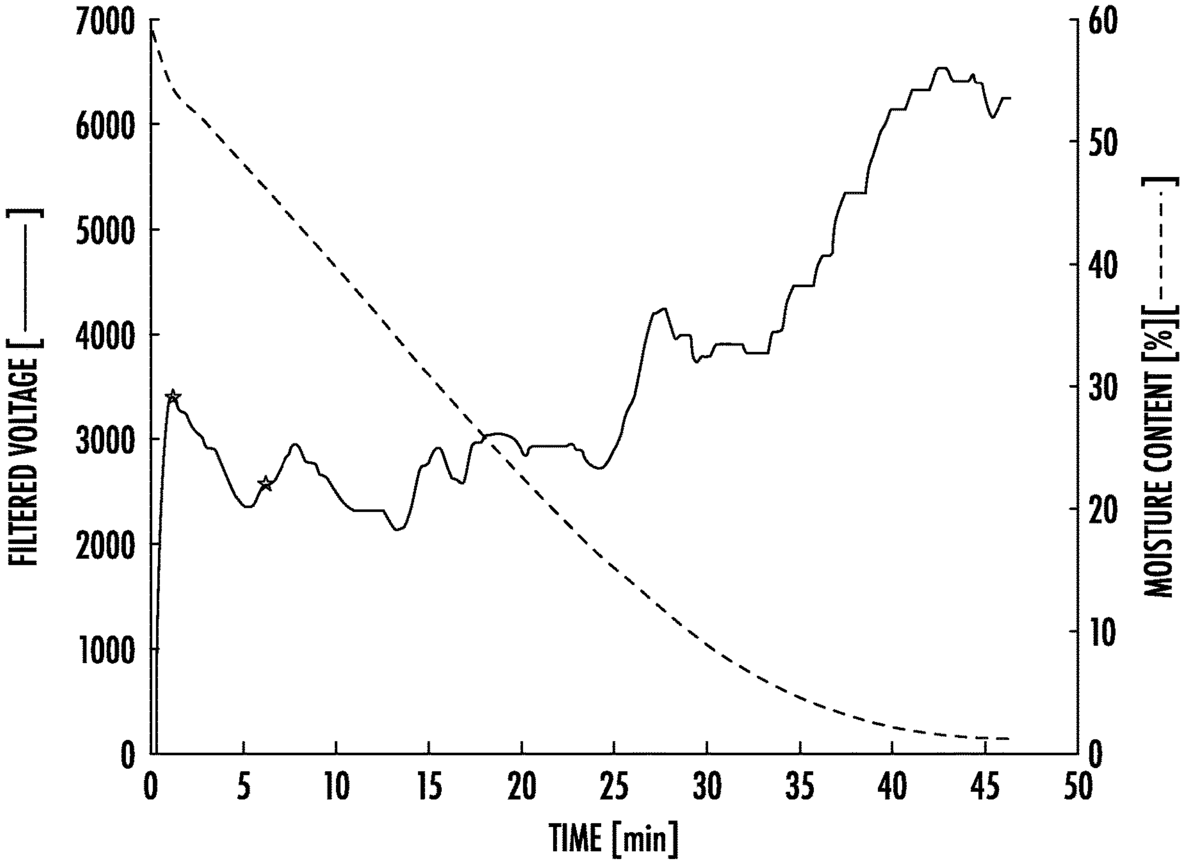
FIG. 5 is a plot of a voltage measured by a moisture sensor indicating a moisture level along with an actual moisture content during a drying cycle according to an exemplary embodiment.

Briefly, FIG. 5 provides a plot of the voltage readings from the moisture sensor against time, along with an estimated dryness level of a laundry load. As can be seen in FIG. 5, the moisture level (e.g., the voltage reading) of the laundry load may register high within the first predetermined time period (e.g., within the first 5 minutes of the drying operation). According to the embodiment shown in FIG. 5, the first goal value is set at about 3300 (e.g., as filtered voltage measured by the moisture sensor). The moisture sensor may then measure a lower filtered voltage (e.g., a higher moisture level) after the initial moisture level measurement, thus indicating that the first moisture level was erroneously determined. As can be seen, the filtered voltage corresponding to the second moisture level continues to fall throughout the second predetermined time interval. Thus, at the expiration of the second predetermined time interval, the first moisture levels determined during the first predetermined time interval are discarded and the second sensing process is initiated. The moisture level of the laundry load may be determined again later in the drying cycle. Returning again to the example shown in FIG. 5, the first goal value of the moisture goal is reached at between 25 and 30 minutes. At this point, the appliance may prepare to cease the drying operation. Advantageously, the drying operation is performed to completion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry treatment appliance, the laundry treatment appliance comprising a rotatable drum and a moisture sensor provided in the rotatable drum, the method comprising:

initiating a drying cycle, the drying cycle comprising a first goal value of a moisture goal of a laundry load;

initiating a sensing process, the sensing process comprising measuring, via the moisture sensor, a first moisture level within a first predetermined time interval;

determining that the first moisture level is above the first goal value within the first predetermined time interval;

measuring, as part of the sensing process via the moisture sensor, a second moisture level within a second predetermined time interval subsequent to the first predetermined time interval;

determining the second moisture level is greater than the first moisture level; and setting the moisture goal based on determining that the second moisture level is greater than the first moisture level.

2. The method of claim 1, further comprising:

initiating a countdown timer in response to determining that the first moisture level is above the first goal value, the countdown timer comprising the second predetermined time interval.

3. The method of claim 1, wherein determining that the first moisture level is above the first goal value comprises:

measuring a sensor voltage at the moisture sensor; and comparing the sensor voltage against a target sensor voltage, the target sensor voltage corresponding to the first goal value.

4. The method of claim 1, wherein setting the moisture goal comprises:

discarding the first moisture level measured within the first predetermined time interval; and initiating a second sensing process after the second predetermined time interval has elapsed.

5. The method of claim 4, wherein initiating the second sensing process comprises measuring, via the moisture sensor, a third moisture level subsequent to the second predetermined time interval.

6. The method of claim 1, wherein the moisture sensor is a moisture sensor bar for sensing moisture within the laundry load.

7. The method of claim 1, wherein the moisture goal based on a selected dryness level.

8. The method of claim 1, further comprising:

estimating a total drying time of the drying cycle, the total drying time being based at least in part on the moisture goal;

determining an additional amount of drying time in response to determining that the first moisture level is above the first goal value within the first predetermined time interval; and executing the additional amount of drying time after performing the estimated total drying time.

9. The method of claim 1, wherein each of the first predetermined time interval and the second predetermined time interval is between 4 minutes and 8 minutes.

10. A laundry treatment appliance comprising:

a cabinet;

a drum rotatably mounted within the cabinet, the drum defining a chamber to selectively receive a laundry load;

a moisture sensor provided within the chamber to sense a moisture level of the laundry load; and a controller operably connected with the moisture sensor, the controller being configured for:

initiating a drying cycle, the drying cycle comprising a first goal value of a moisture goal of a laundry load;

initiating a sensing process, the sensing process comprising measuring, via the moisture sensor, a first moisture level within a first predetermined time interval;

determining that the first moisture level is above the first goal value within the first predetermined time interval;

measuring, as part of the sensing process via the moisture sensor, a second moisture level within a second predetermined time interval subsequent to the first predetermined time interval;

determining the second moisture level is greater than the first moisture level; and setting the moisture goal based on determining that the second moisture level is greater than the first moisture level.

11. The laundry treatment appliance of claim 10, wherein the controller is further configured for:

initiating a countdown timer in response to determining that the first moisture level is above the first goal value, the countdown timer comprising the second predetermined amount of time.

12. The laundry treatment appliance of claim 10, wherein determining that the first moisture level is above the first goal value comprises:

measuring a sensor voltage at the moisture sensor; and comparing the sensor voltage against a target sensor voltage, the target sensor voltage corresponding to the first goal value.

13. The laundry treatment appliance of claim 10, wherein setting the moisture goal comprises:

discarding the first moisture level measured within the first predetermined time interval; and initiating a second sensing process after the second predetermined time interval has elapsed.

14. The laundry treatment appliance of claim 13, wherein initiating the second sensing process comprises measuring, via the moisture sensor, a third moisture level subsequent to the second predetermined time interval.

15. The laundry treatment appliance of claim 10, wherein the moisture sensor is a moisture sensor bar for sensing moisture within the laundry load.

16. The laundry treatment appliance of claim 10, wherein the moisture goal is determined according to a selected dryness level.

17. The laundry treatment appliance of claim 10, wherein the controller is further configured for:

estimating a total drying time of the drying cycle, the total drying time being based at least in part on the moisture goal;

determining an additional amount of drying time in response to determining that the first moisture level is above the first goal value within the first predetermined time interval; and executing the additional amount of drying time after performing the estimated total drying time.

18. The laundry treatment appliance of claim 10, wherein each of the first predetermined time interval and the second predetermined time interval is between 4 minutes and 8 minutes.

* * * * *